(12) United States Patent
Ginossatis

(10) Patent No.: US 8,129,006 B2
(45) Date of Patent: Mar. 6, 2012

(54) STACK SEALABLE HEAT SHRINKABLE FILM

(75) Inventor: Dimitrios Ginossatis, Koropi Atticis (GR)

(73) Assignee: Flexopack S.A., Koropi (GR)

( * ) Notice: Subject to any disclaimer, the term of this patent is extended or adjusted under 35 U.S.C. 154(b) by 1257 days.

(21) Appl. No.: 11/528,741

(22) Filed: Sep. 28, 2006

(65) Prior Publication Data

US 2007/0082150 A1 Apr. 12, 2007

(30) Foreign Application Priority Data

Sep. 30, 2005 (EP) .................................... 05021541

(51) Int. Cl.
| | | |
|---|---|---|
| B32B 27/08 | (2006.01) | |
| B32B 27/16 | (2006.01) | |
| B32B 27/18 | (2006.01) | |
| B32B 27/22 | (2006.01) | |
| B32B 27/24 | (2006.01) | |
| B32B 27/30 | (2006.01) | |
| B32B 27/32 | (2006.01) | |
| B32B 27/34 | (2006.01) | |
| B32B 27/36 | (2006.01) | |
| B32B 27/40 | (2006.01) | |
| B65B 1/04 | (2006.01) | |
| B65B 11/00 | (2006.01) | |
| B65B 53/02 | (2006.01) | |
| C08F 2/46 | (2006.01) | |
| C08F 2/54 | (2006.01) | |
| C08F 2/48 | (2006.01) | |
| B05D 3/02 | (2006.01) | |

(52) U.S. Cl. ..................... 428/34.9; 428/34.8; 428/35.2; 428/35.4; 428/35.6; 428/35.7; 428/36.6; 428/474.4; 428/476.3; 428/480; 428/483; 428/500; 428/507; 428/515; 428/516; 428/518; 428/521; 428/523; 141/10; 53/473; 53/461; 53/442; 427/496; 427/508; 427/384

(58) Field of Classification Search .................. 428/34.1, 428/34.8, 34.9, 35.2, 35.4, 35.6, 35.7, 36.6, 428/36.7, 36.8, 36.9, 36.91, 474.4, 480, 500, 428/515, 516, 518, 523, 476.3, 483, 507, 428/521; 141/10; 53/473, 461, 442; 427/496, 427/508, 384

See application file for complete search history.

(56) References Cited

U.S. PATENT DOCUMENTS

| | | | |
|---|---|---|---|
| 3,299,194 A | 1/1967 | Golike | |
| 3,356,192 A | 12/1967 | Cameron | |
| 3,456,044 A | 7/1969 | Pahlke | |
| 3,956,229 A | 5/1976 | Bollen et al. | |
| 4,064,296 A | 12/1977 | Bornstein et al. | |
| 4,207,364 A | 6/1980 | Nyberg | |
| 4,254,869 A * | 3/1981 | Heier | ............................ 206/497 |
| 4,399,181 A | 8/1983 | Yoshimura et al. | |
| 4,612,221 A | 9/1986 | Biel et al. | |
| 4,786,561 A | 11/1988 | Fong | |
| 4,801,486 A | 1/1989 | Quacquarella et al. | |
| 4,863,769 A | 9/1989 | Lustig et al. | |
| 4,869,049 A | 9/1989 | Richards et al. | |
| 4,911,979 A | 3/1990 | Nishimoto et al. | |
| 4,934,529 A | 6/1990 | Richards et al. | |
| 4,976,898 A | 12/1990 | Lustig et al. | |
| 4,977,022 A | 12/1990 | Mueller | |
| 4,990,562 A * | 2/1991 | Chou et al. | ...................... 525/58 |
| 5,034,281 A | 7/1991 | Kawasaki et al. | |
| 5,079,051 A | 1/1992 | Garland et al. | |
| 5,256,351 A | 10/1993 | Lustig et al. | |
| 5,256,428 A | 10/1993 | Lustig et al. | |
| 5,298,202 A | 3/1994 | Schirmer | |
| 5,302,402 A | 4/1994 | Dudenhoeffer et al. | |
| 5,397,613 A | 3/1995 | Georgelos | |
| 5,562,958 A | 10/1996 | Walton et al. | |
| 5,593,747 A | 1/1997 | Georgelos | |
| 5,698,279 A | 12/1997 | Vicik | |
| 5,834,077 A | 11/1998 | Babrowicz | |
| 5,837,335 A | 11/1998 | Babrowicz | |
| 5,851,610 A | 12/1998 | Ristey et al. | |
| 6,013,378 A | 1/2000 | White et al. | |
| 6,074,715 A | 6/2000 | Lind et al. | |
| 6,146,726 A | 11/2000 | Yoshii et al. | |
| 6,221,410 B1 | 4/2001 | Ramesh et al. | |
| 6,274,246 B1 | 8/2001 | Eggers et al. | |

(Continued)

FOREIGN PATENT DOCUMENTS

AU 511 195 B2 7/1980

(Continued)

OTHER PUBLICATIONS

"15.13xEA—Ethylene Vinyl Acetate (EVA) Copolymers (>50% Ethylene)—European Adhesives," The ChemQuest Group, Inc. http://web.archive.org/web/20080219220919/http://www.chemquest.com/store/ethylene-vinyl-acetate-copolymers-european-adhesives.html (Aug. 26, 2011) (2 pages).

"DuPont™ Elvax® 3170," DuPont Packaging & Industrial Polymers. 3 pages (2004) http://web.archive.org/web/20060516114601/http://www2.dupont.com/Elvax/en_US/assets/downloads/vax3170.pdf.

(Continued)

*Primary Examiner* — Walter B Aughenbaugh

(74) *Attorney, Agent, or Firm* — Jenkins, Wilson, Taylor & Hunt, P.A.

(57) ABSTRACT

The present invention refers to a multilayer heat shrinkable film characterized by a combination of desirable properties, such as high shrinkage, good optical properties, excellent sealability and stack sealability. The invention further is directed to a method of producing said film. The invention is further directed to the use of said film or bags and pouches made therefrom for packaging goods as for example food products. The invention also refers to tubes made with the film.

19 Claims, No Drawings

U.S. PATENT DOCUMENTS

| | | | |
|---|---|---|---|
| 6,346,285 | B1 | 2/2002 | Ramesh |
| 6,406,763 | B1 | 6/2002 | Wolf et al. |
| 6,458,437 | B1 | 10/2002 | Ito et al. |
| 6,514,583 | B1 | 2/2003 | Ahlgren et al. |
| 6,516,588 | B2 | 2/2003 | Jensen et al. |
| 6,534,137 | B1 | 3/2003 | Vadhar |
| 6,572,959 | B1 | 6/2003 | Buongiorno et al. |
| 6,663,905 | B1 | 12/2003 | Ennis et al. |
| 7,473,473 | B2 * | 1/2009 | Verrocchi ............... 428/517 |
| 7,611,770 | B2 | 11/2009 | Kennedy et al. |
| 7,736,726 | B2 * | 6/2010 | McAllister et al. ......... 428/212 |
| 2002/0119334 | A1 | 8/2002 | Shepard et al. |
| 2002/0172834 | A1 | 11/2002 | Rivett et al. |
| 2003/0073785 | A1 | 4/2003 | Okada et al. |
| 2003/0213804 | A1 | 11/2003 | Chomik et al. |
| 2003/0218022 | A1 | 11/2003 | Chomik et al. |
| 2004/0065052 | A1 | 4/2004 | Ramesh et al. |
| 2004/0157077 | A1 | 8/2004 | Roussos |
| 2005/0064123 | A1 | 3/2005 | Chomik et al. |
| 2005/0191439 | A1 | 9/2005 | Hirose et al. |
| 2005/0271877 | A1 | 12/2005 | Ginossatis |
| 2006/0177641 | A1 | 8/2006 | Breese et al. |
| 2006/0199030 | A1 | 9/2006 | Liang et al. |
| 2006/0199912 | A1 | 9/2006 | Fuchs et al. |
| 2006/0272767 | A1 | 12/2006 | Kreitman et al. |
| 2007/0042089 | A1 | 2/2007 | Grah |
| 2008/0003332 | A1 | 1/2008 | Ginossatis |
| 2008/0070047 | A1 | 3/2008 | Rehkugler et al. |
| 2008/0095960 | A1 | 4/2008 | Schell et al. |
| 2008/0274314 | A1 | 11/2008 | Gkinosatis |
| 2008/0274328 | A1 | 11/2008 | Gkinosatis |
| 2008/0305220 | A1 | 12/2008 | Gkinosatis |
| 2009/0176117 | A1 | 7/2009 | Gkinosatis |
| 2009/0191392 | A1 | 7/2009 | Gkinosatis |
| 2009/0196962 | A1 | 8/2009 | Gkinosatis |
| 2009/0263599 | A1 | 10/2009 | Gkinosatis |
| 2010/0024939 | A1 | 2/2010 | Gkinosatis |
| 2010/0028574 | A1 | 2/2010 | Gkinosatis |
| 2011/0159216 | A1 | 6/2011 | Gkinosatis |

FOREIGN PATENT DOCUMENTS

| | | |
|---|---|---|
| EP | 0 005 660 | 11/1979 |
| EP | 0 286 407 | 10/1988 |
| EP | 0 402 043 | 12/1990 |
| EP | 0 472 418 | 2/1992 |
| EP | 0 627 465 | 12/1994 |
| EP | 0 810 087 | 12/1997 |
| EP | 1 072 632 A2 | 1/2001 |
| EP | 0 930 349 B1 | 6/2003 |
| EP | 1060077 | 6/2003 |
| EP | 1131205 | 12/2004 |
| EP | 1 514 680 A1 | 3/2005 |
| EP | 1415930 | 4/2006 |
| EP | 1 770 116 A1 | 4/2007 |
| EP | 1 854 625 A1 | 11/2007 |
| EP | 08162162.5 | 8/2008 |
| EP | 1 985 440 | 10/2008 |
| EP | 1 985 443 A2 | 10/2008 |
| EP | 1 995 058 A1 | 11/2008 |
| EP | 2 077 239 A2 | 7/2009 |
| EP | 2 077 297 A1 | 7/2009 |
| EP | 2 085 216 A1 | 8/2009 |
| EP | 2 111 979 A2 | 10/2009 |
| EP | 2 147 783 A1 | 1/2010 |
| GB | 1 140 765 | 1/1969 |
| GB | 2 236 531 | 4/1991 |
| JP | 62107810 A | 5/1987 |
| JP | 03 200534 | 9/1991 |
| JP | 2003-159761 | 6/2003 |
| JP | 2005-047959 | 2/2005 |
| JP | 2005-335111 | 12/2005 |
| JP | 2006-247870 | 9/2006 |
| WO | WO97/46384 | 12/1997 |
| WO | WO98/21274 | 5/1998 |
| WO | WO98/21276 | 5/1998 |
| WO | WO99/44824 | 9/1999 |
| WO | WO99/57612 | 11/1999 |
| WO | WO00/61439 | 10/2000 |
| WO | WO01/23268 | 4/2001 |
| WO | WO02/26493 | 4/2002 |
| WO | WO2006/053885 | 5/2006 |
| WO | WO2006/102152 | 9/2006 |
| WO | WO2008/091321 | 7/2008 |
| WO | WO2008/118554 | 10/2008 |

OTHER PUBLICATIONS

Harper, "Modern Plastics Handbook," McGraw-Hill: New York, New York. pp. 3.17-3.22 (2000).

Hough, M., and Dolbey, R., "Modern Plastics Compendium, vol. 1—Key Properties and Sources," Smithers Rapra Technology. pp. 87-124 (1995).

Huskić, M., and Šebenik, A., "Characterization of Crosslinked Ethylene-Vinylacetate Copolymers," Polymer International. vol. 31, No. 1 pp. 41-44 (1993).

Interview Summary corresponding to U.S. Appl. No. 12/150,261 dated Sep. 21, 2011.

Interview Summary corresponding to U.S. Appl. No. 12/322,347 dated Sep. 21, 2011.

Kipp, "Plastic Material Data Sheets," MatWeb (2004) (5 pages).

Petrie, "Handbook of Adhesives and Sealants," $2^{nd}$ Edition. McGraw-Hill: New York, New York pp. 465-466 (2007).

Official Action corresponding to U.S. Appl. No. 12/154,662 dated Aug. 18, 2011.

Official Action corresponding to U.S. Appl. No. 12/512,361 dated Aug. 31, 2011.

Interview Summary corresponding to U.S. Appl. No. 12/319,150 dated Sep. 23, 2011.

Official Action corresponding to U.S. Appl. No. 12/150,168 dated Sep. 23, 2011.

ASTM D3985. Standard Test Method for Oxygen Gas Transmission Rate Through Plastic Film and Sheeting Using a Coulometric Sensor. American National Standards Institute. pp. 1-7. www.astm.org.

Extended European Search Report corresponding to European Patent Application No. 08154742.4-2124 dated Jul. 2, 2009.

Interview Summary corresponding to U.S. Appl. No. 12/150,261 dated Dec. 28, 2010.

Official Action corresponding to U.S. Appl. No. 11/801,609 dated Jun. 20, 2011.

Official Action corresponding to U.S. Appl. No. 12/150,168 dated Feb. 16, 2011.

Official Action corresponding to U.S. Appl. No. 12/150,261 dated Mar. 22, 2011.

Official Action corresponding to U.S. Appl. No. 12/154,662 dated Mar. 29, 2011.

Official Action corresponding to U.S. Appl. No. 12/319,149 dated Mar. 22, 2011.

Official Action corresponding to U.S. Appl. No. 12/319,150 dated Oct. 15, 2010.

Official Action corresponding to U.S. Appl. No. 12/319,150 dated Apr. 26, 2011.

Official Action corresponding to U.S. Appl. No. 12/322,347 dated Mar. 16, 2011.

Official Action corresponding to U.S. Appl. No. 12/508,233 dated Mar. 9, 2011.

Anonymous, "Advantages of metallocene ethylene [olymer resins in multilayer stretch films," Research Disclosure, Mason Publications, Hampshire, GB. vol. 419, No. 26 pp. 1-22(1999).

Anonymous, "Some benefits from the use of metallocene ethylene polymers in blown and cast films," Research Disclosure, Mason Publications, Hampshire, GB. vol. 392, No. 54 pp. 1-6 (1996).

ASTM D882-09. Standard Test Method for Tensile Properties of Thin Plastic Sheeting. American National Standards Institute. Jan. 2009. www.astm.org. pp. 1-9.

ASTM D 1003-07 "Haze and Luminous Transmittance of Transparent Plastics," ASTM International. pp. 1-7.

ASTM D 1525-07 "Vicat Softening Temperature of Plastics," ASTM International. pp. 1-9.

ASTM D 2732-03 "Unrestrained Linear Thermal Shrinkage of Plastic Film and Sheeting," ASTM International. pp. 1-5.

ASTM D3418-08. Standard Test Method for Transition Temperatures and Enthalpies of Fusion and Crystallization of Polymers by Differential Scanning Calorimetry. American National Standards Institute. Dec. 2008. www.astm.org. pp. 1-7.

ASTM F1927-07. Standard Test Method for Determination of Oxygen Gas Transmission Rate, Permeability and Permeance at Controlled Relative Humidity Through Barrier Materials Using a Coulometric Detector. American National Standards Institute. Aug. 2007. www.astm.org. pp. 1-6.

BS 2782-0:2004 "Methods of Testing Plastics," British Standards Institution. pp. 1-29 (2004).

English abstract of JP 2005-103902, USUI, Apr. 2005.

European Search Report corresponding to European Patent Application No. 08173056.6-2109 dated Mar. 16, 2009.

European Search Report corresponding to European Patent Application No. 08173057.4-2307 dated Sep. 22, 2009.

Extended European Search Report corresponding to European Patent Application No. 05021541.7-2115 dated Dec. 2, 2005.

Extended European Search Report corresponding to European Patent Application No. 08156814 dated Oct. 9, 2008.

Extended European Search report corresponding to European Patent Application No. 09151289.7-2124 dated Jun. 8, 2009.

Machine Translation of JP 2005-103902, USUI, Apr. 2005 pp. 1-17.

Official Action corresponding to U.S. Appl. No. 11/801,609 dated Sep. 15, 2009.

Official Action corresponding to U.S. Appl. No. 11/801,609 dated Feb. 5, 2010.

Official Action corresponding to U.S. Appl. No. 11/801,609 dated Jul. 15, 2010.

Official Action corresponding to U.S. Appl. No. 12/150,261 dated Oct. 27, 2009.

Official Action corresponding to U.S. Appl. No. 12/150,261 dated Jul. 7, 2010.

Official Action corresponding to U.S. Appl. No. 12/319,149 dated Oct. 15, 2009.

Official Action corresponding to U.S. Appl. No. 12/319,149 dated Jul. 7, 2010.

Official Action corresponding to U.S. Appl. No. 12/322,347 dated Sep. 14, 2010.

* cited by examiner

STACK SEALABLE HEAT SHRINKABLE FILM

The present invention refers to a multilayer heat shrinkable film characterized by a combination of desirable properties, such as high shrinkage, good optical properties, excellent sealability and stack sealability. The invention further is directed to a method of producing said film. The invention is further directed to the use of said film or bags and pouches made therefrom for packaging goods as for example food products. The invention also refers to tubes made with the film.

Generally, the packaging of food items by means of a heat shrinkable bag comprises the following steps
1. Putting the food item inside the bag and removing the air (vacuumising) with the help of a vacuum device.
2. Sealing of the open end of the bag.
3. Placing the vacuum pack in a heat shrinking media such as hot water under a temperature that ensures the shrink of the pack(eg 90 C.).
4. The pack is ready and is characterized by appealing appearance and long shelf life because of the absence of oxygen.

These films need high shrink properties and good optics to ensure an excellent appearance and excellent sealability so that there is no entrance of oxygen to the pack as this would be detrimental for the shelf life of the food.

In some cases, where the food is stored in frozen conditions for example, there is the possibility to use a non gas barrier film. The other characteristics remain the same.

Packaging films with the above properties are well known in the art.

A problem that is often found in the art is that during the packaging process the operators must put the food in the bags with extra care, as they must avoid the overlapping of the bags. When overlapped or semi overlapped packs are vacuumized and sealed, the outer surfaces of the two (or more) bags seal the one to the other under the temperature and pressure conditions used to guarantee the sealability of the inner surfaces. This may lead to high rejects and loss of productivity. This situation in particular occurs in stack sealing procedures, i.e. in a situation, wherein two or more products are situated one upon the other and then are sealed.

If the operator tries to modify the temperature, seal time, pressure conditions there is a high possibility that the inner surfaces do not seal sufficiently.

Using bags that can be heat sealed when overlapping occurs, without problems of insufficient seal strength and sealing of the outer surfaces could lead to higher productivity, smaller cycle of each packed product and less attention required by the operator.

The problem to be solved has been addressed in the past:
EP 1131205 refers to the use of a high melting point polyamide in the outer layer. The use of this material has the disadvantage that it reduces the shrinkage of the final film because of the high vicat of this resin. Therefore, this approach is not suitable for heat-shrinkable films and products made thereof.

EP 1060077 refers to the use of a polyester material in the outside layer. This material also has a high vicat and reduces the shrinkage of the multilayer product.

EP 1415930 A1 refers to the use of peelable combinations comprising polybutylene in the outer layer. The problem in this case is that there is a high risk of deteriorating the optical properties as the outer layer (which contributes a lot to the optical properties of the combination) consists of the blend of two incompatible polymers able to make a cohesive peel. The outer layer should comprise an easily peelable combination so that stack sealability is easily achieved. The peelable composition is applied by "extrusion, co-extrusion or coating of a substrate". However, solution coating is not described therein. Furthermore, this publication does not disclose to use nitrocellulose or nitrocellulose-polyamide mixtures in the coating.

US20050191439 describes the use of radiation curable coatings on heat shrinkable webs. There is no reference to stack sealability or a coating having an antiseal effect.

U.S. Pat. No. 4,786,561 describes the use of PVDC coatings on heat shrinkable films.

SUMMARY OF THE INVENTION

Therefore, the problem underlying the invention is to provide a heat sealable film, which can advantageously be used in stack sealing applications. It is a further problem of the invention to avoid that the outer surfaces of the two (or more) bags in stack sealing applications seal the one to the other under the temperature and pressure conditions used to guarantee the sealability of the inner surfaces. It is a still further problem to provide bags that can be heat sealed when overlapping occurs, without problems of insufficient seal strength and sealing of the outer surfaces. It is an additional problem to provide a film for stack sealing applications which has excellent optical properties and high heat shrinkability.

These problems are overcome by the subject-matter of the independent claims. Preferred embodiments are set forth in the dependent claims.

The inventors have managed to overcome all of these problems by discovering a film combining
1. Excellent overlapping sealability
2. Excellent sealing properties over a big range of machine conditions.
3. Excellent optical properties
4. Manufacturing in a stable and controlled way.
5. High heat shrinkability This is achieved by a heat shrinkable film which uses a special type of coating on the surface of the whole heat shrinkable film or a part of the film.

Definitions:
In this application the following definitions are used:
The term "film" refers to a flat or tubular flexible structure of thermoplastic material.

The term "heat shrinkable" refers to a film that shrinks at least 10% in at least one of the longitudinal and transverse directions when heated at 90° C. for 4 seconds. The shrinkability is measured according to ASTM 2732.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "inner layer" refers to the film layer that comes in direct contact with the product packed. This is also called "sealing layer" as this layer must be hermetically sealed in order to protect the product from ingress of air.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra low density polyethylene (ULDPE), metallocene catalysed polymers and polyethylene plastomers and elastomers.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40% by weight.

As used herein the phrase "ethylene vinyl acetate copolymer" refer to copolymers of ethylene and vinyl acetate.

As used herein, the term EVOH refers to saponified products of ethylene vinyl ester copolymers. The ethylene content is typically in the range of 25 to 50% by weight.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term polyamide refers to homopolymers and copolymers.

As used herein the term coating refers to any material that may be diluted in solvents (eg ethyl acetate, ethyl alcohol, water etc), and which is applied on the surface of the film as a solution and may then be cured with conventional means such as heat drying, radiation curing, UV curing etc. The terms varnish, lacquer are sometimes used for subcategories of the more general term coating. According to the invention, the coating has an antiseal effect. This term means that the coating allows the heat shrinkable film of the invention to be used in stack sealing applications, or in other words, provides stack sealability to the overall films. The invention also comprises heat shrinkable films which comprise more than one, for example two coatings.

All measurement methods mentioned herein are readily available for the skilled person. For example, they can be obtained from the American National Standards Institute at: www.webstore.ansi.org

DETAILED DESCRIPTION OF THE INVENTION

According to a first aspect the present invention is directed to a multi-layer heat shrinkable film comprising at least a coating layer, an outer layer and an inner layer, the film having a shrinkage of at least 10% measured according to ASTM 2732 in water at 90° C. in at least one of MD, TD directions, where the coating layer has been applied onto the outer layer of the film by solution coating, and the outer layer comprises polystyrene homopolymer and/or copolymer.

Preferably, the polystyrene copolymer is styrene butadiene copolymer.

Further, in a preferred embodiment, the coating is having an antiseal effect.

By the heat shrinkable film of the present invention, any sealing of two outer layers to each other can be avoided. The coating thus must be thermal resistant to a certain degree, i.e. must resist the temperature which is commonly used in stack sealing applications. In other words, it must resist to temperatures which are commonly used in stack sealing applications.

A major advantage of the heat-shrinkable film of the present invention is the use of polystyrene homopolymer and/or styrene copolymer (in particular butadiene copolymer) as outside layer because it provides the following unexpected effect: if by any means (eg production flaw) the solution coating (lacquer) is not distributed in a part of the width of the film, the stack sealability effect is not deteriorated. Therefore, the present heat-shrinkable film provides perfect characteristics in this regard.

As mentioned above, attempts to modify the temperature, seal time, pressure conditions were not successful in that there is a high possibility that the inner surfaces do not seal sufficiently. The present approach overcomes this disadvantage of the prior art.

The solution to be applied to the film preferably is based on an organic solvent, an aqueous solvent or mixtures thereof. As mentioned above, ethyl acetate, ethyl alcohol, ethoxy propanol, water and mixtures thereof may be used as solvents as long as they are capable of solving the polymer in question.

In one preferred version, the multilayer film is irradiated before or after the coating process. The irradiation may be a beam, gamma radiation, UV radiation or other. In case the coating is "radiation curable", it is advantageous to make the coating first and irradiate in a later stage or in line.

In a preferred embodiment, the coating comprises nitrocellulose, one or more polyamides or a blend of nitrocellulose and polyamides. It is most preferred to use a coating comprising at least nitrocellulose, since that showed the best results (see Examples).

The polyamides used preferably have a melting point of 100-120° C. This means that the material is more apt to soften and shrink in a temperature like 90° C. than a polyamide with a comparably high melting point of >175° C.

In a further embodiment, the coating applied to the outer surface is substantially transparent. This coating must be glossy enough to achieve a good optical appearance of the film and also capable to provide an antiseal effect so that the final article (pouch) is stack sealable. The whole film of the invention thus preferably is transparent. This is in particular useful since in food packaging applications, transparency of the packaging is of utmost importance for the consumer.

The film of the invention comprises at least the coating layer defined above, an outer layer and an inner layer. Or in other words, the layers have the order: coating layer/outer layer/inner layer.

Preferably, the heat shrinkage at 90° C. according to ASTM 2732 is at least 40 percent in both machine and transverse direction. High heat-shrinkability is a highly wanted characteristic of the films of the present invention.

In the film according to the present invention, a heat sealing layer may be present comprising a single polyolefin or a blend of different polyolefins. In a preferred version of the structure, the sealing layer comprises at least one homogeneous polyolefin.

In a preferred version of the invention, the multilayer film comprises an oxygen barrier material, preferably PVDC, EVOH, polyamide or polyester.

Between the sealing layer and the oxygen barrier layer, a tie layer could be used. Preferred materials for this tie layer may be ethylene ester copolymers, such as ethylene vinyl acetate copolymers, ethylene methyl acrylate copolymers and other materials well known in the art. A preferred version might include maleic anhydrite modified ethylene ester copolymers or maleic anhydrite modified LLDPE. Commercial trademarks are for example BYNEL from Dupont and ADMER from Mitsui.

The outer layer of the present invention may include materials such as polyolefins, polyamides, polyesters, polystyrene homopolymers or copolymers and other polymers. However, polystyrene homopolymer or copolymer is obligatorily present.

Between the outer and the barrier layer there may be another layer incorporating a tie layer. Preferred materials for this tie layer may be ethylene ester copolymers, such as ethylene vinyl acetate copolymers, ethylene methyl acrylate copolymers and other materials well known in the art. A preferred version might include maleic anhydrite modified ethylene ester copolymers or maleic anhydrite modified LLDPE. Commercial trademarks are for example BYNEL from Dupont and ADMER from Mitsui.

Any of the layers described above may also include additives well known in the art such as slip agents, antiblock, polymer processing aids, antistatic, antifog, acid scavengers, odour scavengers and the like. A person skilled in the art may select the right additives according to any particular needs.

The coatings used for adhesion to the outer layer may be based on inks without pigmentation such as Decolorant Quadrit from SICPA (these are generally called varnishes). The Decolorant Quadrit is a polyamide/nitrocellulose blend coating.

Other matt or glossy heat resistant coatings such as VERNIS THERMOMAT 84SI063334 or 84SI062222 (glossy heat varnish) from SICPA are also possibly used. These two grades are based on nitrocellulose. Another category of coatings may be oxygen barrier coatings such as EXCEVAL from Eval Europe and PVDC coating(latex). These coatings are selected from materials like PVOH, PVDC and the like that provide a barrier to gases like oxygen, carbon dioxide and others.

Other preferred lacquers that are efficiently used in the present application are
PVB based lacquers like FLEXO 2C from Sun Chemical.
Nitrocellulose based lacquers with polyurethane plasticizers like RETROTHERM from Sun Chemical.

Lacquers that increase the sealing properties may be applied, but not if the sealing strength increases to the point that the stack sealable effect is destroyed.

Typical coatings that may be used for the present application may further include, but are not limited to polyester based, acrylate and methacrylate based, ethyl cellulose based, cellulose acetate propionate based, polyvinyl butyral based, ketone based, vinyl based, hydrocarbon based, shellac based, polyvinyl alcohol based polymers or mixtures thereof.

In a preferred embodiment, the coating layer may comprise polyvinyl butyral.

In a further preferred embodiment, the coating layer may comprise nitrocellulose and polyurethane based plasticizer.

It turned out that these both coatings improve the optics of the materials especially after shrinkage.

The coating may or may not contribute to the oxygen barrier properties of the film.

It is generally noted that the thickness of the coating preferably is in the range of about 1-2 µm. The thickness is small enough not to influence the shrinkability of the film in a substantial degree. It is of importance to have a uniform thickness of the coating in this range which is difficult to achieve by common coextrusion of multi-layer films.

In case an oxygen barrier coating is used, there is no need to incorporate an oxygen barrier layer in the multilayer coextrusion. This may lead to a very much reduced raw material cost for the producer of the structure.

According to a second aspect, the present invention discloses a bag, tube or pouch comprising a film according to the present invention.

In a third aspect, the invention provides a method for producing a film as defined above wherein the heat shrinkable film is manufactured and the coating is subsequently applied or laminated by solution coating to form the complete film.

In a preferred embodiment, the heat shrinkable film is irradiated before or after the coating process. Furthermore, the coating is preferably applied and then cured with conventional means such as heat drying, radiation curing, UV curing.

Preferably, the solution coating is applied to the film by printing the solution onto the film.

In a further aspect, the invention is directed to the use of the films or the bag or pouch of the invention for packaging food. For example, the food item is putted inside the bag and the air is removed (vacuumising) with the help of a vacuum device. Subsequently, the open end of the bag is sealed and the vacuum pack is placed in a heat shrinking media such as hot water under a temperature that ensures the shrink of the pack (eg 90° C.). The pack than is ready and is characterized by appealing appearance and long shelf life because of the absence of oxygen.

The present invention is now described by the following Examples:

EXAMPLES

A 5 layer film is produced in a double bubble commercial line with the following recipe
Inner(sealing layer), 32% by weight P1+30% by weight P2+20% by weight E1+10% by weight E2+8% by weight ADDITIVES
Adjacent layer 93% by weight E1+7% by weight ADDITIVES
Barrier layer PVDC commercial grade
Adjacent layer 30% by weight M1+65% by weight E3+5% by weight ADDITIVES
Outer layer 95% by weight S1+5% by weight ADDITIVES
See table 1
The thickness of the structure is 26/ 7/ 7/ 7/ 8 starting from the inner and going to the outer layer.
The stretching ratio during the test was 5/1 in the MD and 3.5/1 in the TD.
The product was then coated with different coatings on a commercial flexographic printing line.
The coatings used were
1. Decolorant Quadrit 74DI063000N01 from SICPA
2. VERNIS THERMOMAT 84SI063334 from SICPA
3. A lacquer from Sun Chemical.
4. A lacquer from Sun Chemical.
Material 1 is the coex structure coated with coating 1 and material 2 is the coex structure coated with coating 2 and so on. The mass of the coating applied in each of the two cases were 1.2 g/m$^2$. The solvent blend used for viscosity control were 95% by volume ethanol +5% by volume ethoxy propanol.
Coatings 1 and 2 were based on nitrocellulose. Lacquer 3 is PVB based. Lacquer 4 is nitrocellulose based with polyurethane plasticizer.
The two different reels were kept in storage for 2 days and then were both irradiated under e-beam radiation, dose 4 MRADS. Then after 1 day storage, a series of tests were performed. For comparison purposes, a commercial stack sealable (well known in the market) material was used.

Before the actual testing, it was noted that the material coated with number 2 coating was hazy. This was expected as this coating is supposed to give a matt effect to the surfaces coated. So, it was decided this film not to be tested according to optical properties.

TABLE 1

| Type | Description | Manufacturer | Melt Index g/10 min | Density g/cm$^3$ | Melting point ° C. |
|---|---|---|---|---|---|
| E1 | EVA | Dupont 3135 X | 0.35 | 0.93 | 95 |
| E2 | EVA | 1005 VN2 | 0.40 | 0.928 | 102 |
| E3 | EVA | Dupont 3165 | 0.7 | 0.94 | 89 |
| P1 | Plastomer | Dow Affinity VP 8770 | 1.0 | 0.885 | 74 |
| S1 | SB COPOLYMER | DK13 | 10 | 1.01 | |
| M1 | EMA copolymer | Atofina LOTRYL 29MAO3 | 2-3.5 | 0.95 | 61 |
| P2 | Plastomer | Dow Affinity PL 1880 | 1 | 0.902 | 100 |

Tests
1. Haze measurement. The haze measurement was done according to ASTM D 1003.
2. Gloss measurement. This was done according to BS 2782.
3. Shrinkage measurement done according to ASTM 2732.
4. Sealing window.

This final test was done on a Bosch vacuum sealing machine. We put one piece of the tube of each material on another so that there is an overlap area. We seal this area and then we pull. The material is thought to be OK if the outer surfaces are easily pulled without any delamination or resistance and the inner(sealing layers) are at the same time strongly sealed. Different sealing times were applied in order to see which of the three materials has a more extended operating window.

The results are displayed on table 2

TABLE 2

| | HAZE | GLOSS | SHRINKAGE (MD/TD) | STACK SEAL WINDOW (sealing times) |
|---|---|---|---|---|
| Material 1 | 8 | 90 | 54/46 | 4-10 |
| Material 2 | | | 52/45 | 4-10 |
| Comparison | 10 | 95 | 35/42 | 4-10 |
| Material 3 | 8 | 92 | 53/47 | 4-10 |
| Material 4 | 9 | 95 | 56/46 | 4-10 |

So, the materials 1, 2, 3, 4 have the same stack sealable operating window and they combine much improved shrinkage properties as well as excellent optics in the case of material 1, 3, 4.

A further test was done on the above trials. A zone of material was not coated with lacquer. Then the overlap sealing test was executed as described above. The operator of the test tried to separate the outer surfaces of the bags and see if the propagation was interrupted in the unlacquered zone. The propagation was unexpectedly found not to interrupt on the unlacquered area.

The invention claimed is:

1. A multi-layer heat shrinkable film comprising at least an anti-sealing coating layer, an outer layer and an inner sealing layer, the film having a shrinkage of at least 10% measured according to ASTM 2732 in water at 90° C. in at least one of MD, TD directions, where the coating layer has been applied onto the outer layer of the film by solution coating, the outer layer comprises polystyrene homopolymer and/or copolymer, and wherein the coating layer provides an anti-sealing effect and is a radiation curable coating.

2. A multi-layer heat shrinkable film comprising at least an anti-sealing coating layer, an outer layer and an inner sealing layer, the film having a shrinkage of at least 10% measured according to ASTM 2732 in water at 90° C. in at least one of MD, TD directions, where the coating layer has been applied onto the outer layer of the film by solution coating, the outer layer comprises polystyrene homopolymer and/or copolymer, and wherein the coating layer provides an anti-sealing effect and comprises nitrocellulose, one or more polyamides, a blend of nitrocellulose and polyamides, polyvinyl butyral, or nitrocellulose and polyurethane based plasticizer.

3. A multi-layer heat shrinkable film comprising at least an anti-sealing coating layer, an outer layer and an inner sealing layer, the film having a shrinkage of at least 40 percent in both machine and transverse directions measured according to ASTM 2732 in water at 90° C., where the coating layer has been applied onto the outer layer of the film by solution coating, the outer layer comprises polystyrene homopolymer and/or copolymer, and wherein the coating layer provides an anti-sealing effect.

4. The film of claim 1, 2 or 3, wherein the coating applied to the outer surface is substantially transparent.

5. The film of claim 1, 2, or 3, where the film includes an oxygen barrier layer.

6. The film of claim 5, where the oxygen barrier layer is one of PVDC, EVOH, polyamide and polyester.

7. The film of claim 1, 2, or 3, where the film is radiated prior to or after the coating process.

8. The film of claim 1, 2, or 3, wherein the inner layer comprises at least one homogeneous alpha olefin copolymer.

9. The film of claim 2, where the coating layer comprises polyvinyl butyral.

10. The film of claim 2, where the coating layer comprises nitrocellulose and polyurethane based plasticizer.

11. The film of claim 1, 2, or 3, where the outer layer comprises polystyrene homopolymer and/or styrene butadiene copolymer.

12. A bag, tube or pouch comprising a film of claim 1, 2, or 3.

13. A method for producing a film in accordance with claim 1, 2, or 3, wherein the heat shrinkable film is manufactured and the coating is subsequently applied or laminated onto the outer layer to form the complete film.

14. The method of claim 13, wherein the heat shrinkable film is irradiated before or after the coating process.

15. The method of claim 13, wherein the coating is applied and then cured with heat drying, radiation curing, or UV curing.

16. The method of claim 13, wherein the solution coating is applied to the film by printing the solution onto the film.

17. A method of packaging food, the method comprising:
a) providing a food item; and
b) placing the food item in the bag, tube or pouch of claim 12.

18. The method of claim 14, wherein the coating is applied and then cured with heat drying, radiation curing, or UV curing.

19. A method of packaging food, the method comprising:
a) providing a food item; and
b) placing the food item in the film of claim 1, 2, or 3.

* * * * *